US006889942B2

(12) United States Patent
Preston (10) Patent No.: US 6,889,942 B2
(45) Date of Patent: May 10, 2005

(54) STEERABLE PARACHUTE CONTROL SYSTEM AND METHOD

(75) Inventor: Daniel Preston, Kew Gardens, NY (US)

(73) Assignee: Atair Aerospace, Inc., Brooklyn, NY (US)

(*) Notice: Subject to any disclaimer, the term of this patent is extended or adjusted under 35 U.S.C. 154(b) by 0 days.

(21) Appl. No.: 10/315,466

(22) Filed: Dec. 9, 2002

(65) Prior Publication Data

US 2003/0197095 A1 Oct. 23, 2003

Related U.S. Application Data

(60) Provisional application No. 60/341,006, filed on Dec. 7, 2001.

(51) Int. Cl.[7] .............................................. B64D 17/00
(52) U.S. Cl. ...................................................... 244/152
(58) Field of Search ................................ 244/142–155, 244/138 R, 139, 137.1, 900–904

(56) References Cited

U.S. PATENT DOCUMENTS

| | | | |
|---|---|---|---|
| 3,433,441 A | 3/1969 | Cummings | 244/138 |
| 4,440,366 A | 4/1984 | Keeler et al. | 244/138 R |
| 4,865,274 A | 9/1989 | Fisher | 244/152 |
| 5,678,788 A | 10/1997 | Hetzer et al. | 244/152 |
| 6,293,202 B1 * | 9/2001 | Woodall et al. | 102/387 |
| 6,322,021 B1 | 11/2001 | Fisher | 244/49 |
| 6,343,244 B1 * | 1/2002 | Yoneda et al. | 701/3 |
| 6,587,762 B1 * | 7/2003 | Rooney | 701/16 |

OTHER PUBLICATIONS

International Search Report for PCT/US02/39121; mailing date: Sep. 5, 2003.

* cited by examiner

Primary Examiner—Galen Barefoot
(74) Attorney, Agent, or Firm—Bourque & Associates (57) ABSTRACT

An autonomous guided parachute system for cargo drops that divides the requirements of guidance and soft landing into separate parachutes. Said invention includes a high wing-loaded ram air parachute for guidance, a larger round parachute for soft landing, a harness/container system, flight computer, position sensors and actuation system. The system is dropped from an airplane. A predetermined period of drogue fall ensures a stable position prior to deploying the guidance parachute. The flight controller determines a heading to intersect with an area substantially above the desired target and controls the guidance parachute via pneumatic actuators connected to the parachutes steering lines to fly on that heading. At a minimum altitude prior to the system's impact with the ground the flight computer transitions the system from the fast high performance guidance parachute to a larger landing parachute by releasing the guidance parachute to static line extract and deploy the landing parachute. If the system reaches a position substantially above target area prior to the parachute transition altitude the flight computer controls the system into a spiral dive or other rapid altitude dropping maneuver until the transition altitude is reached. Once transitioned to the landing parachute the system descends for a brief period unguided under the landing parachute until touchdown.

26 Claims, 5 Drawing Sheets

STEERABLE PARACHUTE CONTROL SYSTEM AND METHOD

This application claims priority to U.S. Provisional Application Ser. No. 60/341,006 filed Dec. 7, 2001.

BACKGROUND OF THE INVENTION

1. Field of the Invention

The invention relates generally to unmanned parachutes for cargo drops. More particularly, it relates to a control system and method for targeted landing of cargo using controllable parachutes.

2. Discussion of Related Art

Parachutes have evolved over the years into highly sophisticated systems, and often include features that improve the safety, maneuverability, and overall reliability of the parachutes. Initially, parachutes included a round canopy. A skydiver was connected to the canopy via a harness/container to suspension lines disposed around the periphery of the canopy. Such parachutes severely lacked control. The user was driven about by winds without any mechanism for altering direction. Furthermore, such parachutes had a single descent rate based upon the size of the canopy and the weight of the parachutist.

In the mid-1960's the parasol canopy was invented. Since then, variations of the parasol canopy have replaced round canopies for most applications, particularly for aeronautics and the sport industry. The parasol canopy, also known as gliding or ram air parachute, is formed of two layers of material—a top skin and a bottom skin. The skins may have different shapes but are commonly rectangular or elliptical. The two layers are separated by vertical ribs to form cells. The top and bottom skins are separated at the lower front of the canopy to form inlets. During descent, air enters the cells of the canopy through the inlets. The vertical ribs are shaped to maintain the canopy in the form of an airfoil when filled with air. Suspension lines are attached along at least some of the ribs to maintain the orientation of the canopy relative to the pilot. The canopy of the ram air parachute functions as a wing to provide lift and forward motion. Guidelines operated by the user allow deformation of the canopy to control direction and speed. Ram air parachutes have a high degree of lift and maneuverability.

Despite the increased lift from a ram air parachute, round canopies are still used for cargo drops. However, as tile weight of cargo increases, the size of the canopy must increase to obtain an appropriate descent rate. Reasonable sizes of round parachutes greatly limit the amount of cargo which can be dropped. Therefore, a need exists for a parachute system which can carry additional cargo weight. Additionally, accurate placement of cargo drops from high altitude with round parachutes is impossible. Adjustments can be made for prevailing winds at various altitudes but the cargo is likely to drift off course due to variations. Furthermore, improvements in surface-to-air missiles requires higher altitude drops in order to protect aircraft. In military use, round parachutes are generally used from an altitude around one thousand (1000) feet to ensure accurate placement. However, new, inexpensive, hand held surface-to-air missiles can put in jeopardy airplanes up to twenty-five thousand (25,000) feet in altitude. Current military technique is to use a special forces soldier to pilot both parachute and cargo to the ground from altitudes of twenty-five to thirty-five thousand (25–35,000) feet. This limits cargo to six hundred fifty (650) pounds, as it must be attached to a human. Therefore, a need exists for an autonomous guided parachute system for cargo which can operate at high altitudes as well as scale to heavier cargo weights.

Autonomous ram air parachutes systems have been developed for cargo drops but suffer from several problems that have prevented them from being generally adopted into military techniques. Prior art guided systems include a harness/container system, a single parachute, flight computer, guidance and navigation control software, a GPS, and electric motor actuators. The flight computer must calculate a flight path and glide the system from the drop point all the way to the ground target. In order for the flight computer to accomplish this, the parachute used must b of low wing loading to ensure docile and slow flight. Such lightly loaded parachutes fly with free flight forward speeds of approximately twenty-five (25) miles per hour or slower. Typical wing loadings are around one (1) pound per square foot of wing area. Such slow systems present several problems, first they are greatly effected by winds aloft. At high altitudes winds are quite strong and can be several times the forward speed of the wing. This necessitates the need to map out specific winds at each altitude by dropping radio frequency transmitting sensors units. The collected data must be analyzed and imported to the autonomous systems flight computer to enable a drop position to be calculated and then a flight path. Another problem is the systems time in the air with such light wing loaded parachutes is quite long, increasing their vulnerability and delivery time. Another problem is that higher weight cargo requires proportionally larger wings which become completely impractical far below the maximum weight desired for military use. Therefore, a need exists for an improved autonomous guided parachute system which can provide accurate targeting control from high altitudes, while flying at higher speeds to reduce or negate wind effects, and be able to scale to the ultimate high weight cargo required by militaries.

Typically, static line deployment is used for cargo drops. A line from the harness/container is attached to the cargo hold of the delivery aircraft. The cargo is then pushed out of the hold. The line causes the parachute to be deployed, with or without the use of a drogue. However, air currents around the delivery aircraft can interfere with proper deployment of a gliding parachute using a static line. Also, the cargo is not typically falling stable upon immediate exit which can cause difficulties during opening of the gliding parachute. In order to slightly delay opening, existing systems utilize a double-bag deployment system. However, the double-bag system is complicated and expensive to construct as well as complicated to pack. Therefore, a need exists for an improved system for delaying the deployment of a gliding parachute.

Additionally prior art systems use electric motor actuators and batteries. Typically the motors are overly complicated DC servo drive motors. At high altitudes temperatures are very low. Such systems suffer from the requirement for very large, low power density cold weather batteries. To meet military demand high altitude systems must operate up to −65 F. and existing systems do not function at such temperatures. As such there exists a need for lighter simpler actuators and power system that are unaffected by extreme temperatures.

SUMMARY OF THE INVENTION

The deficiencies of the prior art are substantially overcome by the guided, multi-stage parachute system of the present invention. According to an aspect of the invention, the parachute system includes two different kinds of parachutes for use during different phases of the cargo drop process. The requirements of guidance and soft landing have been separated. A fast, high performance ram air parachute is used to guide the cargo in substantially a straight line from exit point to substantially overhead of the target location and then rapidly spiral dive down to lose altitude. The system transitions to a larger unguided landing parachute prior to impact. The multi-stage parachute system utilizes the advantages of different kinds of parachutes to achieve greater control and improved performance. Since the gliding parachute is not used for landing of the cargo, it can be designed for extremely high speed and high wing load capabilities. These features allow higher reliability in high altitude drops by limiting the effect of winds and greatly reduce time aloft. Since the landing parachute is not used to control location, it can be designed for a soft landing of large cargos. Also, it can be deployed at the lowest possible altitudes to minimize unguided drift.

According to another aspect of the invention, a novel flight controller provides control for the parachute system. The flight controller determines the position and altitude of the parachute system. The flight controller operates the steering controls of the guidance parachute. Once within a specified radius of overhead the target location, the flight controller further operates steering controls of the guidance parachute for a rapid, controlled descent overhead the target location until a predetermined minimum altitude is reached. Once the predetermined altitude is reached, the flight controller releases the guidance parachute to transition to the landing parachute.

According to another aspect of the invention, static line drogue deployment of the parachute system is performed with a time delay on releasing the drogue to extract and deploy the main. The time delay may be a mechanical delay or may be controlled by the flight controller. The time delay allows the system to stabilize under drogue before deployment of the main guidance wing.

According to other aspects of the invention, the release of the guidance parachute operates to static line deploy the landing parachute. According to another aspect of the invention, a two stage harness is used to attach the parachute system to the cargo. During transport and release of the cargo from the airplane, the parachute system is closely attached to the cargo. Following deployment of the drogue chute, the parachute system is spaced further away from the cargo.

According to another aspect of the invention, the parachute system of the invention is used with explosive cargo to create a "smart" bomb. The gliding parachute and flight controller are used to steer the explosive cargo over a desired target location. The landing parachute may be used to land the explosive cargo when it is over the target location. Alternatively, according to another aspect of the invention, a landing parachute is not used. The gliding parachute is used to fly the explosive cargo at high speed into the target or the flight controller detonates the explosive at a preset altitude over the target.

According to another aspect of the invention, a flight controller determines position of the parachute system using GPS signals and controls the guidance parachute to reach a desired destination.

According to another aspect of the invention, the flight controller logs position and control information and optional sensor data during flight. The flight controller includes a microprocessor and memory. During flight, in order to control the parachute, the flight controller determines the position and altitude of the parachute system. This information can be recorded at predetermined intervals. Information from the memory can be retrieved to analyze performance of the flight controller and the parachute system.

According to another aspect of the invention, the flight controller includes a transceiver, preferably a radio frequency transceiver. During flight, the transceiver is used to transmit position, altitude, orientation or other information to a base location. The base location may be located on the ground, in the deploying airplane, or other location. The information from the flight controller may be used to monitor operation of the system in real-time. Additionally, the transceiver may receive information from the base location. Such information may include manual override control of the system or change in target coordinates.

According to another aspect of the invention the steering and release actuators are pneumatic, being powered by compressed gas instead of battery power. Miniature carbon fiber high pressure compressed gas tanks can store far more power density than cold weather batteries and are unaffected by extreme cold.

DETAILED DESCRIPTION

Figure 1:
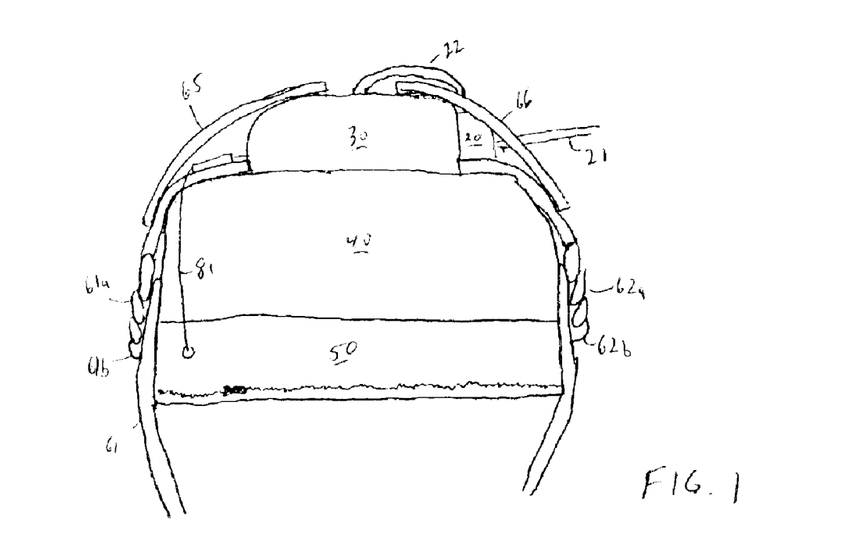
FIG. 1 is a side view of a parachute system according to an embodiment of the present invention.
Figure 2:
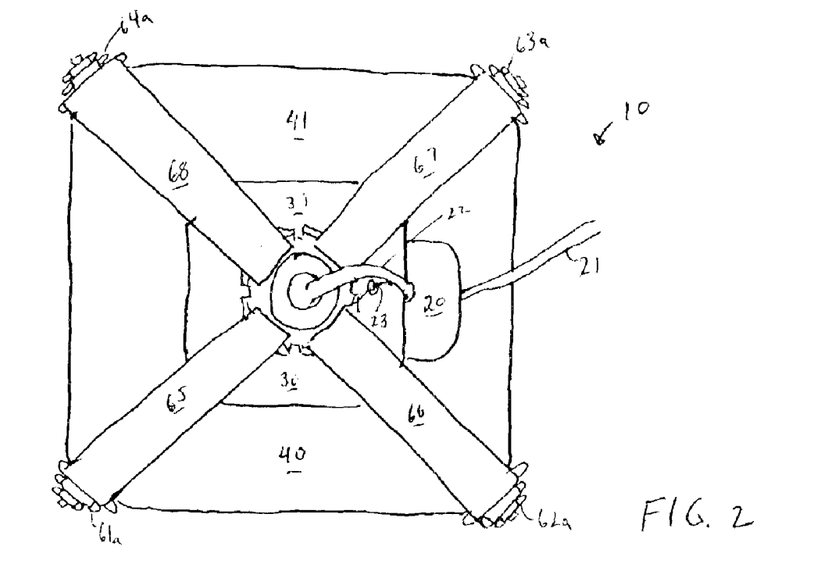
FIG. 2 is a top view of the parachute system of FIG. 1.

In order to provide improved performance for automatic control of cargo drops, the parachute system of the present invention includes multiple parachutes and a flight controller. FIGS. 1 and 2 are respectively a side view and a top view of an embodiment of the parachute system 10 of the present invention when packed for deployment. The parachute system includes a drogue 20, a high wing loaded, guidance parachute or wing 30, and a landing parachute 40. Preferably, the guidance parachute is a high wing loaded, high speed, steerable, ram air parachute. However, any controllable wing or parachute may be used. Preferably, the landing parachute is a larger parachute allowing slow unguided vertical descent. A flight controller 50 is disposed below the parachutes and operates to control deployment of the parachutes and steering of the guidance parachute. The parachutes 20, 30, 40 may be of any known design based upon the type of chute required for the specific operation.

Figure 3:
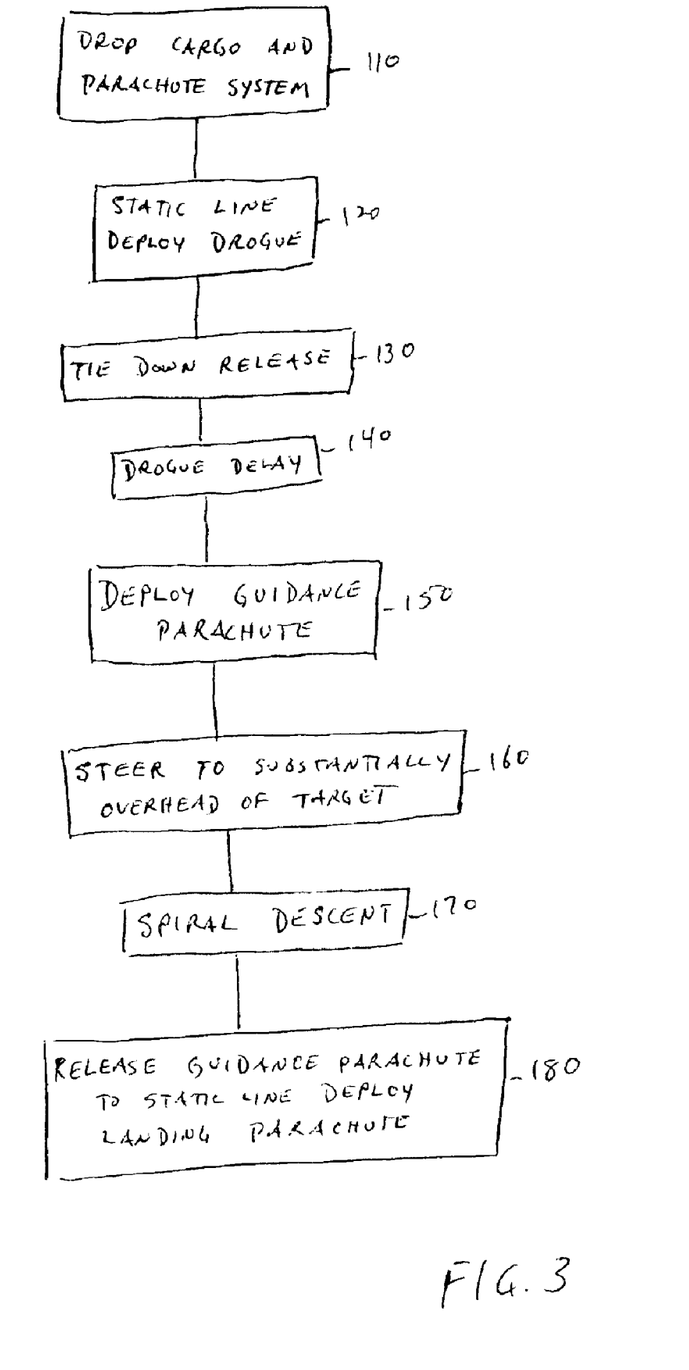
FIG. 3 is a flow diagram for operation of a parachute system according to an embodiment of the present invention
Figure 4A:
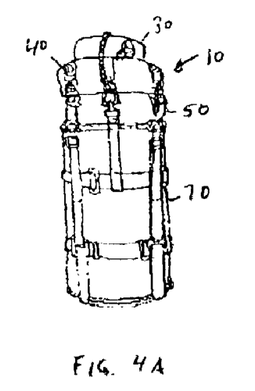
FIGS. 4A–G illustrate the sequence of operation of a parachute system according to an embodiment of the present invention.

FIG. 3 is a block diagram illustrating the operation of the parachute system 10 under control of the flight controller 50. Illustrations relating to the sequence of operation of the parachute system 10 are illustrated in FIGS. 4A–4G. As illustrated in FIG. 4A, the parachute system 10 is attached closely to the cargo 70 to prevent movement in the cargo hold of the plane. FIG. 4A illustrates the cargo 40 as a barrel, but any other type of cargo container, including pallets, could be used. The orientation of the parachute system and the mechanisms for attachment to the cargo will depend upon the type of cargo being dropped.

Figure 4B:
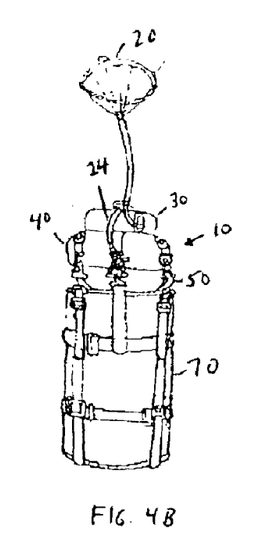
Figure 4C:
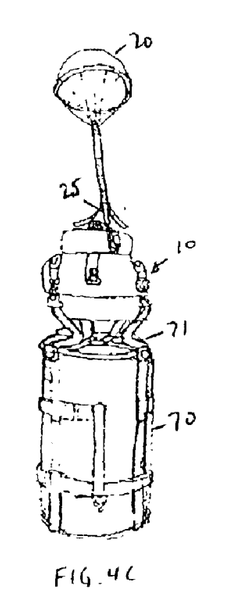

To start the cargo drop process, illustrated in FIG. 3, the cargo and parachute system are deployed in a known manner from the delivery aircraft at step 110. Preferably, a static line deployment is used. Upon deployment of the cargo and parachute system, the drogue 20 is deployed (step 120; FIG. 4B) preferably using a static line 21 (FIG. 1). Of course, other mechanisms could be used to deploy the drogue, including a controllable release operable from by the flight controller 50. The drogue properly orients the cargo with the parachute system 10 on top and releases the tie downs 25.

During the delivery flight and upon discharge of the cargo, the parachute system 10 is tightly retained against the cargo 70. However, for improved flight, the cargo 70 is preferably suspended below and away from the parachute system 10 via a swivel. Thus, at step 130, the drogue chute releases tie downs 25 between the parachute system 10 and the cargo 70. Preferably, the parachute system is closely attached to the cargo using 3-ring releases. Cable 24 (FIG. 4B) from the drogue bridal to the 3-ring releases allows the cargo to separate from the parachute system upon deployment of the drogue. Following release of the tie downs 25, the cargo 70 is attached to the parachute system 10 with a harness 71. The harness 71 allows the cargo to hang from the parachute system 10. Any type of harness 71 can be used to retain a proper orientation of the cargo below the parachute system 10. Preferably, a swivel 72 is included in the harness 71 to allow for spurious movement of the cargo from winds during descent. The parachute system 10 of the present invention is not limited to any particular tie down 25 or harness 71. Furthermore, the parachute system 10 could be directly attached to the cargo 70 with out the need for the separation in step 130.

According to an embodiment of the present invention, at step 140, an inventive hydraulic time delay is introduced for the drogue 20. Tension on the drogue bridal is applied to a piston in hydraulic fluid. The piston has an orifice drilled through it to allow passage of fluid from one side of the piston to the other. As fluid is incompressible the flow can not go supersonic and the speed the piston can move is able to be fixed. The motion of the piston is transferred to a cable that initiates the guidance wing deployment at the end of its stroke. The purpose of the time delay is to ensure the system is in stable drogue fall before deploying the guidance parachute 30. The delay may also be controlled by the flight controller via an actuator (not shown). Alternatively, a double bag system could be used for the guidance parachute instead of the drogue delay.

Figure 4D:
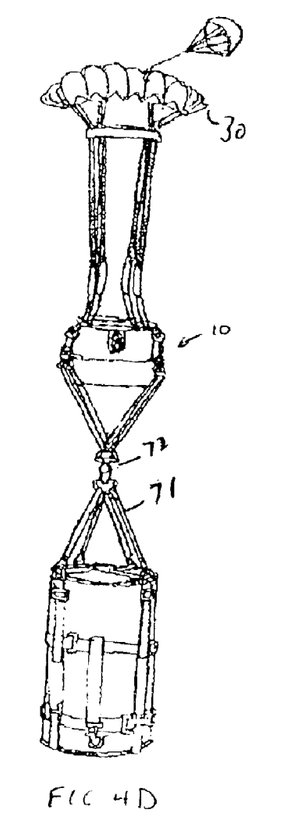

Following the drogue delay, the guidance parachute 30 is deployed (step 150; FIG. 4D). As illustrated in FIG. 2, the guidance parachute is retained in a multiple flap container 31 prior to deployment. Following the delay, the release cable 23 is pulled which opens the bag 31. According to an embodiment of the invention, the release cable 23 removes a pin from a string holding the flaps of the multiple flap container 31 closed. The string also retains riser extensions 65, 66, 67, 68 at the bridal 22. The riser extensions 65, 66, 67, 68 are connected to the harness/container system 10 to carry the weight of the system and cargo and relieve stresses on the fabric of the harness/container system during use of the drogue. The drogue bridal 22 attached to the guidance parachute bag 30 causing it to be deployed when the container 31 is released. Alternatively, the release cable 23 could be operated by the flight controller 50.

The guidance parachute 30 is preferably of a type having high wing load and high speed. According to an embodiment of the invention, the guidance parachute is preferably wing loaded in the range of five to twenty (5–20) pounds per square foot wing loading, and has forward flight speeds of forty to one hundred forty (40 to 140) miles per hour. An exception to such performance characteristics may to be when the system is used with extremely small payload, i.e., seventy-five (75) pounds. With small payloads, further reducing the size of the parachute becomes impractical. Lightweight systems may fly at lower wing loadings. Current systems of the invention have been tested from four and one half to ten (4.5–10) pounds per square foot loading.

The guidance parachute 30 is connected via four risers 61, 62, 63, 64 attached to the harness/container system 10. The four risers 61, 62, 63, 64 extend from the suspension harness 71, and preferably from the swivel 72 to the parachute system 10. The webbing from the swivel are sewn to the sides of the container of the parachute system. Each riser includes a 3-ring release 61a, 62a, 63a, 64a between the container system and the guidance parachute. Before deployment of the guidance parachute, the risers 61, 62, 63, 64 extend into the multiple flap bag 31 through the corners. Upon deployment, the risers suspend the parachute system 10 and the cargo 70 from the guidance parachute 30.

Brake lines 81, 82 are connected to the guidance parachute 30 for control. The brake lines 81, 82 are retained in sleeves 81a, 82a attached to the risers 61, 64, and extend into the parachute system for attachment to the steering actuators. The steering actuators are operated by the flight controller 50 to steer the canopy 30 in a known manner. The steering actuators are preferably pneumatic and built as an integrated steering module possessing multiple functions. Pneumatically controlled stages can transverse linearly to pull either the left or right control line. The lines are each routed through a pneumatic guillotine cutter which allows the line connection to the actuator to be severed when transitioning from the guidance parachute to the landing parachute. Additionally, many ram air parachutes deploy best when the brake lines are partially pulled during deployment. The force required to hold the brake lines during deployment is typically many times the force required to actuate a turn once in flight. As such, so as not to over design the strength of the steering actuators, an additional pneumatic actuator is provided to pull a pin for each line. There is a loop on each brake line that can be set or trapped by the actuation prior to retracting the pin. The pin allows a very high holding force on the brake lines during deployment and then is retracted freeing the brake lines to be controlled by the steering actuators.

At step 160, the flight controller adjusts the direction of the guidance parachute 30 using the brake lines 81, 82 to direct the cargo towards the desired target location. Operation of the flight controller 50 for steering the guidance parachute is discussed below.

Figure 4E:
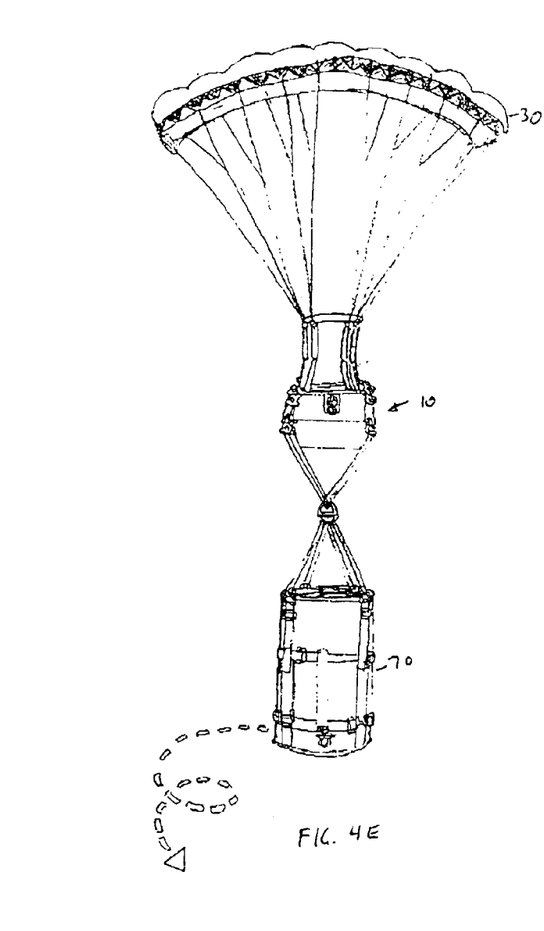
Figure 4F:
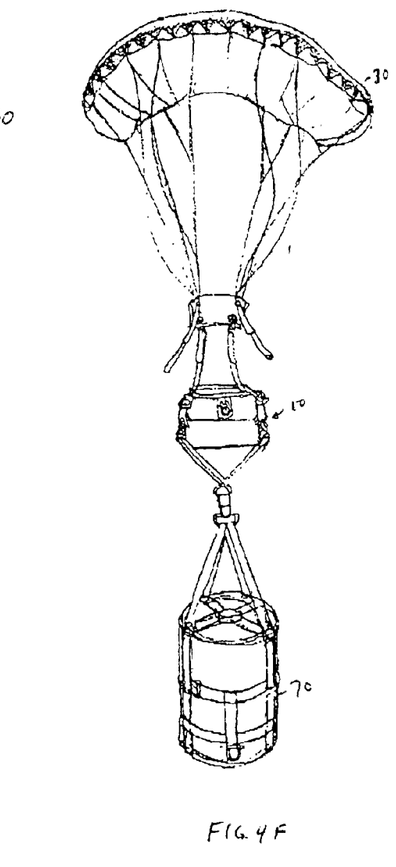
Figure 4G:
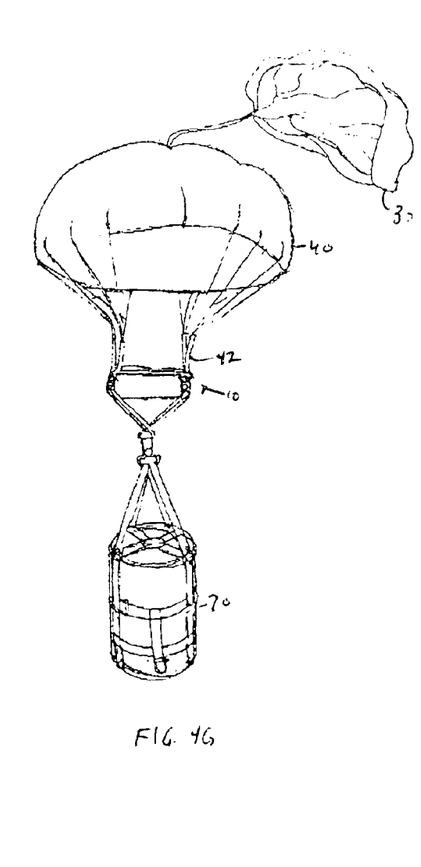

Once the cargo 70 and parachute system 10 reaches an area approximately overhead of the desired target location, the guidance parachute is controlled to fly in a spiral dive or holding pattern (step 170; FIG. 4E). Other holding patterns, such as a FIG. 8 or flat spiral (slow altitude drop maneuver), could also be used. A spiral will initiate the fastest possible vertical decent. Tested systems with a wing load of four and one half (4.5) have shown a vertical decent rate in a spiral dive of 120 mph. The cargo 70 and parachute system 10 descends without significant variation from the target location. If the flight computer detects significant drift it will stop t,he spiral correct and reinitiate, if time permits once corrected and parachute system 10 reaches an area approximately overhead of the desired target location, the guidance parachute is controlled to fly in a spiral dive or holding pattern (step 170; FIG. 4E). Other holding patterns, such as a FIG. 8 or flat spiral (slow altitude drop maneuver), could also be used. A spiral will initiate the fastest possible vertical decent. Tested systems with a wing load of four and one half (4.5) have shown a vertical decent rate in a spiral dive of one hundred twenty (120) mph. The cargo 70 and parachute system 10 descends without significant variation from the target location. If the flight computer detects significant drift it will stop the spiral correct and reinitiate, if time permits once corrected.

Prior to the system spiraling into the ground, at a minimum altitude preset into the flight computer, actuators pull cables from the four 3-ring releases on the guidance parachute risers to release the guidance parachute 30. At the same time the guillotine cutters sever the brake lines to the steering actuator. A line (not shown) connects at least one of the risers from guidance parachute 30 to a release on a multi flap container 41 containing the landing parachute. This line further attaches the guidance parachute 30 to the landing parachute 40 so its drag extracts and deploys the landing parachute. Additionally by remaining tethered, nothing is lost. The guidance parachute 30, thus, operates as a drogue for the landing parachute 40. The landing parachute, preferably a round canopy parachute, allows the cargo to slowly descend, landing unguided. The landing parachute should be released at a low enough altitude to prevent significant deviations from wind drift. Risers 42 for the landing parachute are sewn on the inside of the bag to the risers 61, 62, 63, 64 on the outside of the bag. Upon deployment of the landing parachute, the parachute system maintains the same orientation due to the consistent placement of the risers.

Militaries are content to use round parachutes from low altitudes, i.e., one thousand (1000) feet. Drift from such a low altitude is easy to correct and accuracy is high. This invention simply seeks to create a system to transport cargo from a high altitude plane out of harms way as rapidly as possible to a targeted low altitude for subsequent landing under a conventional round cargo parachute.

Figure 5:
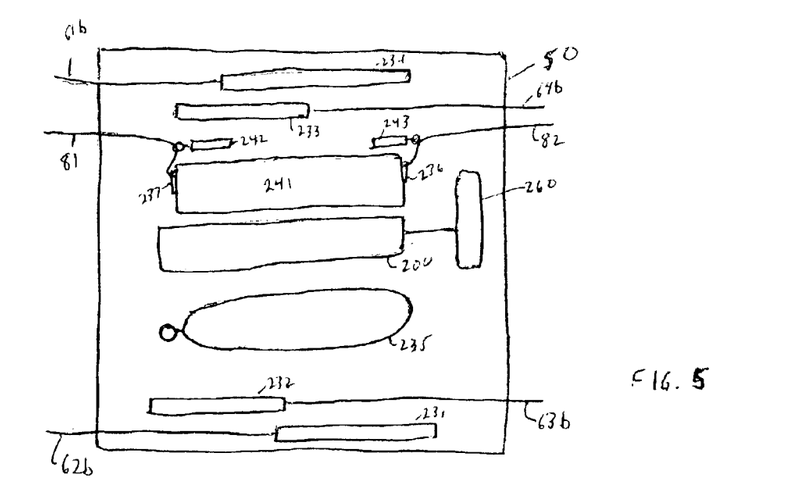
FIG. 5 is a top view of a flight controller according to an embodiment of the present invention.
Figure 6:
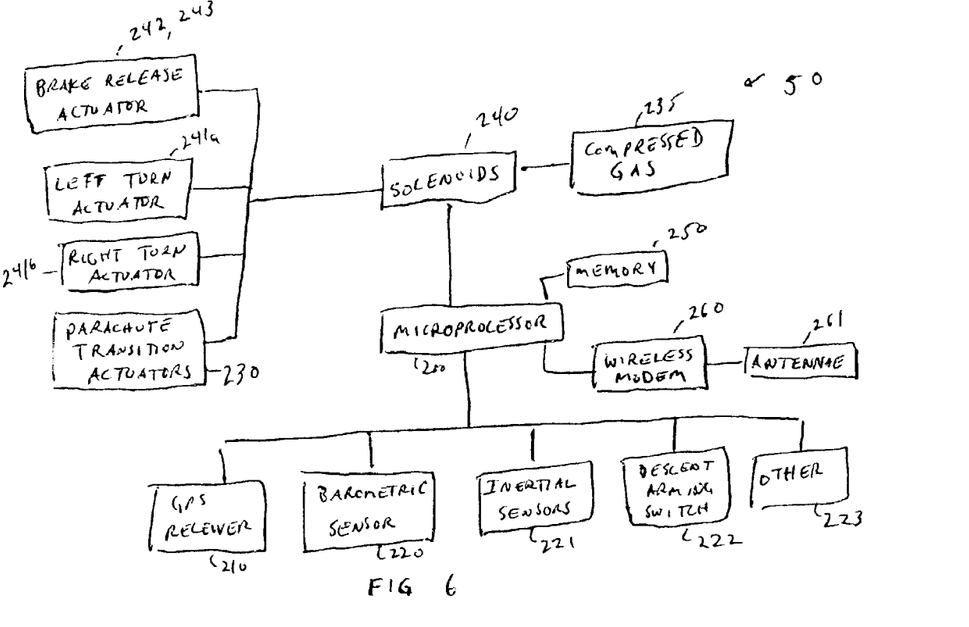
FIG. 6 is a block diagram of the components of the flight controller.

FIG. 5 is a top view of components of the flight controller according to an embodiment of the present invention. FIG. 6 is a block diagram of the components of the flight controller. While specific components are illustrated and discussed herein, the flight controller may be designed in any manner to provide the desired functions and operations. Preferably, the flight controller 50 includes a microprocessor 200 and associated memory 250. The instructions for operation of the microprocessor 200 are stored in the memory. They may be created and operated in any known computer programming language. The microprocessor 200 is programmed to provide the steps set forth in FIG. 3.

Attached to or integrated with the microprocessor 200 are other devices to provide inputs to or outputs from the microprocessor 200 for operation of the parachute system. In particular, the flight controller 50 may include a Global Positioning Satellite (GPS) system receiver 210, a barometric altimeter sensor 220, inertial sensors 221, a decent arming switch 222, or other sensors 225, integrated with the microprocessor 200 as a single unit. Alternatively, discrete sensors may be used to provide inputs to the microprocessor 200. The microprocessor 200 uses information from the integrated or discrete sensors to determine the position of the parachute system 10. The altitude is provided based on a three dimensional GPS fix using the GPS receiver 210. However, an additional barometric pressure sensor 220 may be used for redundancy. Other sensors may include inertial navigation or gyros 221 for determining position in the event that GPS signals are lost or jammed.

The microprocessor 200 uses the information from the sensors to determine position and to control the parachute system 10. The microprocessor 200 has outputs connected to electro pneumatic solenoids 240 for controlling pneumatic actuators 230, 241, 242, 243. The pneumatic actuators are powered by a source of compressed gas 235, preferably compressed nitrogen or dry air. Alternatively, electric motors could be used instead of the actuators. However, the use of pneumatic actuators with compressed gas is advantageous for the parachute system of the present invention. The extremely cold air at the high altitudes at which the parachute system is deployed would greatly drain a battery or other source of electric power. By using the pneumatic actuators, the electrical requirements of the system for operating the microprocessor 200 is very low and system weight is reduced.

The embodiment of the present invention uses two principal types of actuators: steering control actuators 240 and guidance wing release actuators 230. Other actuators could be included to provide additional functionality. For example, the flight controller 50 could be used to deploy the drogue or to deploy the glide parachute. If the flight controller performs these functions, additional actuators and solenoids would be necessary.

The steering control actuators 241, 242, 243 operate the brake lines 81, 82 of the glide parachute 30 to direct the parachute system to the target location. Upon deployment of the guidance parachute 30, the brake lines 81, 82 must be held in for proper inflation and stabilization. A pair of deployment actuators 242, 243 are used to hold the brake lines in. Loops in the brake lines 81, 82 are held by the deployment actuators 242, 243. Once the guidance parachute is deployed and stabilized, the deployment actuators 242, 243 release the loops and the brake lines 81, 82 are positioned for normal operation. The brake lines 81, 82 are controlled by steering actuators 241, which may include one actuator 241a, 241b for each line. The actuators 241 pull or release the brake lines to alter the direction of flight of the system. Upon release of the guidance parachute 30, the brake lines also need to be released. Actuators 236, 237 are used for this purpose. Actuators 236, 237 are positioned around the brake lines 81, 82 at the entrance to the steering actuators 241. Actuators 236, 237 operate guillotine cutters to cut the brake lines 81, 82 for release. Other combinations of actuators are possible for control of the brake lines. The steering actuators 241 may be used to hold in the brake lines during deployment rather than the deployment actuators. Other kinds of release mechanisms may also be used instead of the guillotine cutters.

Four release actuators 231, 232, 233, 234 are used to release the risers 61, 62, 63, 64 holding the glide parachute 30 to the parachute system 10. Each of the release actuators 231, 232, 233, 234 is connected to one of the release cables 61b, 62b, 63b, 64b for the 3-ring releases on the risers. When the glide parachute is to be released, the microprocessor 200 operates the release actuators 231, 232, 233, 234 to pull the release cables 61b, 62b, 63b, 64b. Alternative methods, including guillotine cutters could be used to release the risers 61, 62, 63, 64 under control of the microprocessor 200.

The flight controller 50 may be powered and operated at any time during the deployment process depending upon when it is needed. According to an embodiment of the invention, the flight controller 50 is powered prior to deployment from the drop plane to allow a GPS fix to be obtained before dropping. Software 'arming' of the system is possible by detecting the vertical decent rate. However, a steeply diving airplane can falsely arm the system and then the units would begin steering and possible release actuators while the system is still in the cargo bay. A preferred method uses an arming switch that senses when the guidance parachute has left the container. This has been accomplished by use of a magnet sewn into the parachute bag and a magnetic reed switch connected to the flight computer.

Once the guidance parachute 30 is released, the microprocessor 200 operates to control the direction of flight. The GPS receiver 210 provides position information which is also used to determine orientation. The microprocessor 200 provides signals to the steering control actuators 241 attached to the brake lines 81, 82 of the guidance parachute 30 to steer the system. The target location is stored in memory 250. The system determines the necessary changes in flight direction to move from the currently traveled vector to one that would intersect overhead of the target. Preferably, the system uses PID control algorithms to prevent oversteering when correcting the flight vector. Such oversteering results in a system that flys a sinewave or damped sinewave flight path instead of perfectly straight.

Once the target location has been reached, as determined by the microprocessor 200, the microprocessor 200 actuates steering actuators 241 to initiate a sustained turn or spiral dive or other holding pattern. The cargo and parachute system continues to descend over the target location. Once a set altitude is reached, as stored in the memory 250, as determined by the altimeter 220 or the GPS receiver 210, the microprocessor 200 sends a signal to the guidance wing release actuators 230 to release the risers 61, 62, 63, 64 of the guidance parachute 30 and sever the brake lines, thus deploying the landing parachute. The system continues it descent using the landing parachute until touchdown.

The flight controller 50 needs to be programmed with the target location and altitude information for the landing parachute release. Input/output (I/O) ports are attached to the microprocessor 220 for the purpose of inputting the necessary information. The I/O ports may be of any known type, and may include a display, keyboard, mouse, disk or other memory drive, or a port for connection to a computer or other storage device. FIG. 6 illustrates a wireless modem 260 and antenna 261 as an I/O port for inputting information. Additionally, if appropriate, the drogue delay time may also be entered into the system using the I/O ports.

When the glide ratio of the system is known, the flight computer may be connected to an indicator light to show when the drop plane is within the cone of acceptability to drop the cargo and have it fly to its intended target. This aids drop personnel in the cargo plane.

Since the microprocessor 200 of the flight controller 50 is receiving information about the flight, such as position and altitude, the information can be stored in the memory 250. A timer (not shown) can be used to provide time based information in the memory 250. Upon completion of the drop, the stored information from the memory 250 can be retrieved through the I/O ports for analysis and review. Other sensors could also be included in the flight controller 50 for determining and recording data for analysis. For example, sensors could be used to determine G-forces, stress and strain placed on various components of the parachute and the cargo. These sensors can be connected to the microprocessor 200 to store the sensed information in the memory.

The flight controller 50 may also include a transceiver for wireless communication with the flight controller. The wireless modem 260 and antenna 261 illustrated in FIG. 6 can also function as a transceiver. The transceiver is preferably RF, but can include an infrared or other transmission medium. The transceiver can be used to output position, altitude or other information, in real time to a base station. The base station may be in the delivery aircraft, at the target location, or some other control position. The information transferred from the flight controller 50 to the base station can be used to monitor flight and operation of the system. Additionally, the transceiver can be used to receive information from the base station. The base station could transfer information changing any of the flight parameters, such as the target location. Alternatively, direction information could be transmitted to the flight controller for the steering controller 240. Thus, the parachute system could be remote controlled by an operator at the base station, instead of automatic operation. In a preferred embodiment telemetry data sent to the base station is graphically displayed on a screen to allow remote control without visual contact with the parachute system.

A GPS repeater provides the GPS signals within the cargo area of the aircraft. Thus, the GPS receiver of the flight controller can acquire a position lock prior to being dropped. The flight controller must be powered on several minutes before drop to allow a valid ephemeris to be downloaded which can take up to four (4) minutes. If they are then shut off, the software directs them to look for GPS satellites as if they were in the same position from time of power off. With the inventive system, it has been found that up to two (2) hours 'black out' period results in a reacquisition of position lock in forty (40) ms to eight (8) sec, after two (2) hours extending out to four (4) hours the time lengthens to its maximum of up to four (4) minutes.

A GPS repeater provides the GPS signals within the cargo area of the aircraft. Thus, the GPS receiver of the flight controller can acquire a position lock prior to being dropped. The flight controller must be powered on several minutes before drop to allow a valid FIG. 3 illustrates the steps for operation of the flight controller after launch of cargo and parachute system from the delivery aircraft. The flight controller would also include a program for operation in a pre-launch mode to prepare for launch. The pre-launch mode include the steps of uploading target coordinates through the I/O ports and downloading a valid ephemeris for the drop location to the GPS receiver. Target coordinates on the inventive system may be uploaded by an RS232 or other connection from a laptop or dedicated handheld terminal, or simply by inserting a memory chip with the data into the flight computer, i.e. a compact flash card is uploaded with target data from the laptop software and then inserted into the flight computer. The ephemeris is automatically acquired by the GPS.

In another embodiment, the parachute system of tile present invention is used to convert dumb bomb to guided 'smart' bombs. Militaries have been converting inexpensive 'dumb' bombs into more effective guided weapons by a bolt on tail kit that includes a guidance computer/sensors/software and actuators for piloting the tail fins of the bomb, i.e., JDAN/conversion. These devices have received extensive use in the Gulf War and in Afghanistan. Cost wise they are very desirable, but performance wise they have certain shortcomings. The bombs typically weigh from five hundred to two thousand (500–2000) pounds. The tail fins are an extremely small wing surface for guiding such a heavy weight; as such, they are not capable of much course correction or significant glides. They suffer from accuracy and standoff shortcomings. A parachute system of the present invention attached to a dumb bomb, typically at the tail, to create a bomb guided by a high performance guidance parachute overcomes the problems of limited standoff and accuracy while remaining economically competitive. The coordinates of the desired target are loaded into the system. Since the bomb is intended to explode at impact, the landing parachute can be eliminated. Soft landing required for cargo is not required for bombs. Thus, step 180 in FIG. 3 can be eliminated alloying the system to fly under the high speed, high wing load guidance wing until impact with the target or triggered to detonate at a predetermined distance above the target.

While the present inventions have been described with a certain degree of particularity, it is obvious from the foregoing detailed description that one skilled in the art may make one or more modifications which are suggested by the above descriptions of the novel embodiments.

What is claimed is:

1. A controllable parachute system for controlled guidance and delivery of an air dropped payload, the system comprising:
   a steering ram air guidance parachute, connectable to the payload for a first period of time following launch adapted to quickly move the payload after drop to a first altitude substantially overhead a target location;
   a second landing parachute connectable to the payload for a second period of time following launch adapted to land the dropped payload from a second altitude substantially said overhead target location to impact at said target location; and
   a flight controller responsive to said target location and to said first and second altitudes, for steering the guidance parachute to the first altitude that is a predetermined first distance substantially overhead said target location, for maneuvering the guidance parachute to the second altitude that is a predetermined second distance substantially overhead said target location less than said first distance without substantially departing from being overhead said target location as it descends from the first to the second altitudes during the first period of time and for transitioning to the second landing parachute substantially at said second altitude prior to impact at the target location.

2. The parachute system according to claim 1, further comprising a drogue connectable to the payload for a third period of time prior to the first period of time.

3. The parachute system according to claim 2, further comprising a drogue delay timer determining the third period of time.

4. The parachute system according to claim 1, wherein the flight controller includes:
   a GPS receiver providing information about a current location of the payload;
   a processor for determining the system's fight vector and desired flight path capable of controlling actuators to steer the guidance parachute and release actuators to initiate a transfer from the guidance parachute to the landing parachute.

5. The parachute system according to claim 4, wherein the GPS receiver is loaded with an ephemeris of the target location.

6. The parachute system according to claim 4, wherein the actuators are pneumatically powered.

7. The parachute system according to claim 1, wherein the guidance parachute is loaded over three pounds per square foot.

8. The parachute system according to claim 1, wherein the altitude dropping maneuver includes a spiral dive.

9. The parachute system according to claim 1, wherein the flight controller includes an altimeter for determining an altitude of the payload.

10. The parachute system according to claim 1, wherein the flight controller includes a transmitter for sending data from the flight controller to a base station.

11. The parachute system according to claim 1, wherein the flight controller includes a transceiver for transmitting data between the flight controller to a base station.

12. The parachute system according to claim 1, wherein the payload is an explosive device.

13. The parachute system according to claim 1, wherein the flight controller stores data relating to operation of the flight controller during flight.

14. A method for air dropping a payload using a multiple parachute system, the multiple parachute system including at least a guidance parachute and a landing parachute and a flight computer controlling steering and parachute transitioning actuators, comprising the steps of:
   launching the payload from a delivery aircraft;
   deploying the guidance parachute;
   controlling the guidance parachute to position the payload to a first altitude substantially overhead of a target location, to position the payload to a second altitude substantially overhead said target location less than the first altitude without substantially departing from being overhead the target location as it is lowered from the first to the second altitudes; and
   deploying the landing parachute substantially at the second altitude prior to impact.

15. The method for air dropping a payload according to claim 14, further comprising the step of stabilizing the system and cargo under a drogue after launching the payload and prior to deploying the guidance parachute.

16. The method for air dropping a payload according to claim 15, further comprising the step of using a hydraulic timing mechanism to control the drogue fall time.

17. The method for air dropping a payload according to claim 15, wherein the step of stabilizing the system and cargo occurs for a predetermined period of time.

18. The method for air dropping a payload according to claim 14, further comprising the step of releasing tie downs holding the parachute system to the payload to suspend the payload from the parachute system.

19. The method for air dropping a payload according to claim 18, wherein the step of releasing the tie downs includes releasing the tie downs with tension from a bridal on the drogue.

20. The method of air dropping a payload according to claim 14, wherein the step of steering the guidance parachute includes the steps of:
   determining a current location of the payload;
   determining a direction from the current location of the payload to the target location; and controlling the guidance parachute for flight in the determined direction.

21. The method of air dropping a payload according to claim 20, wherein the step of determining a current location of the payload includes obtaining a position location from a GPS receiver.

22. The method of air dropping a payload according to claim 21, further comprising the step of loading an ephemeris for the target location in the GPS receiver prior to the launching step.

23. The method of air dropping a payload according to claim 14, further comprising the steps of:
   determining flight data relating to flight of the parachute system and payload; and
   storing the flight data.

24. The method of air dropping a payload according to claim 14, further comprising the steps of: determining flight data relating to flight of the parachute system and payload; and
   transmitting the flight data to a base station.

25. The method for dropping a payload according to claim 14, further comprising the step of providing the target location to the parachute system prior to the launching step.

26. The method for dropping a payload according to claim 14, further comprising the step of transmitting control information to the parachute system for controlling the guidance parachute.

* * * * *